US012354453B2

(12) United States Patent
Muthukrishnan et al.

(10) Patent No.: US 12,354,453 B2
(45) Date of Patent: Jul. 8, 2025

(54) PREDICTING FIRE SPREAD IN A FACILITY

(71) Applicant: Honeywell International Inc., Charlotte, NC (US)

(72) Inventors: Karthikeyan Muthukrishnan, Salem (IN); Mahadevan Somasundram Balakrishnan, Chennai (IN); K Ganesh, Andalpuram (IN); Sameer Tripathi, Bengaluru (IN); Gaddigesh Nagappa Admani, Bengaluru (IN)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 18/378,334

(22) Filed: Oct. 10, 2023

(65) Prior Publication Data

US 2025/0118182 A1 Apr. 10, 2025

(51) Int. Cl.
*G08B 17/06* (2006.01)
*G08B 17/10* (2006.01)

(52) U.S. Cl.
CPC ............. *G08B 17/06* (2013.01); *G08B 17/10* (2013.01)

(58) Field of Classification Search
CPC ................................ G08B 17/06; G08B 17/10
See application file for complete search history.

(56) References Cited

U.S. PATENT DOCUMENTS

| | | | | |
|---|---|---|---|---|
| 8,253,574 | B2 | 8/2012 | Li et al. | |
| 9,986,313 | B2 * | 5/2018 | Schwarzkopf | H04Q 9/00 |
| 10,002,510 | B2 | 6/2018 | Ryder | |
| 11,583,770 | B2 * | 2/2023 | Delmonico | A63F 13/65 |
| 12,101,387 | B2 * | 9/2024 | MacGabann | G06Q 10/06316 |
| 2011/0112660 | A1 | 5/2011 | Bergmann et al. | |
| 2021/0049885 | A1 * | 2/2021 | Lee | G08B 17/00 |
| 2024/0312174 | A1 * | 9/2024 | Savanur | G06T 7/20 |

FOREIGN PATENT DOCUMENTS

| | | | |
|---|---|---|---|
| CN | 105809874 | A | 7/2016 |
| KR | 102220328 | B1 | 2/2021 |
| KR | 102275989 | B1 | 7/2021 |

* cited by examiner

*Primary Examiner* — John A Tweel, Jr.
(74) *Attorney, Agent, or Firm* — Brooks, Cameron & Huebsch, PLLC

(57) ABSTRACT

Devices, systems, and methods for predicting fire spread in a facility are described herein. In some examples, one or more embodiments include a computing device comprising a processor and a memory having instructions stored thereon which, when executed by the processor, cause the processor to receive an indication of a fire detected by an event device of a plurality of event devices installed in a facility, sort the plurality of event devices into a plurality of priority levels based on a determined likelihood of fire spread to each of the plurality of event devices, receive data collected by the plurality of event devices during the fire, and provide, via an interface, graphical information descriptive of a spread of the fire based on the received data.

20 Claims, 4 Drawing Sheets

PREDICTING FIRE SPREAD IN A FACILITY

TECHNICAL FIELD

The present disclosure relates to devices, systems, and methods for predicting fire spread in a facility.

BACKGROUND

Facilities, such as commercial facilities, office buildings, hospitals, campuses (e.g., including buildings and outdoor spaces), and the like, may have an event system that can be triggered during an event, such as an emergency situation (e.g., a fire) to warn occupants to evacuate. Such an event system may include an alarm system having a control panel and a number of event devices (e.g., sensors, sounders, pull stations, etc.) located throughout the facility (e.g., on different floors and/or in different rooms of the facility) that can perform an action when an event (e.g., a hazard event, a fault event, etc.) is occurring in the facility. In an example of an event, the number of event devices may provide a notification of the event to the occupants of the facility via alarms and/or other mechanisms.

DETAILED DESCRIPTION

Figure 1:
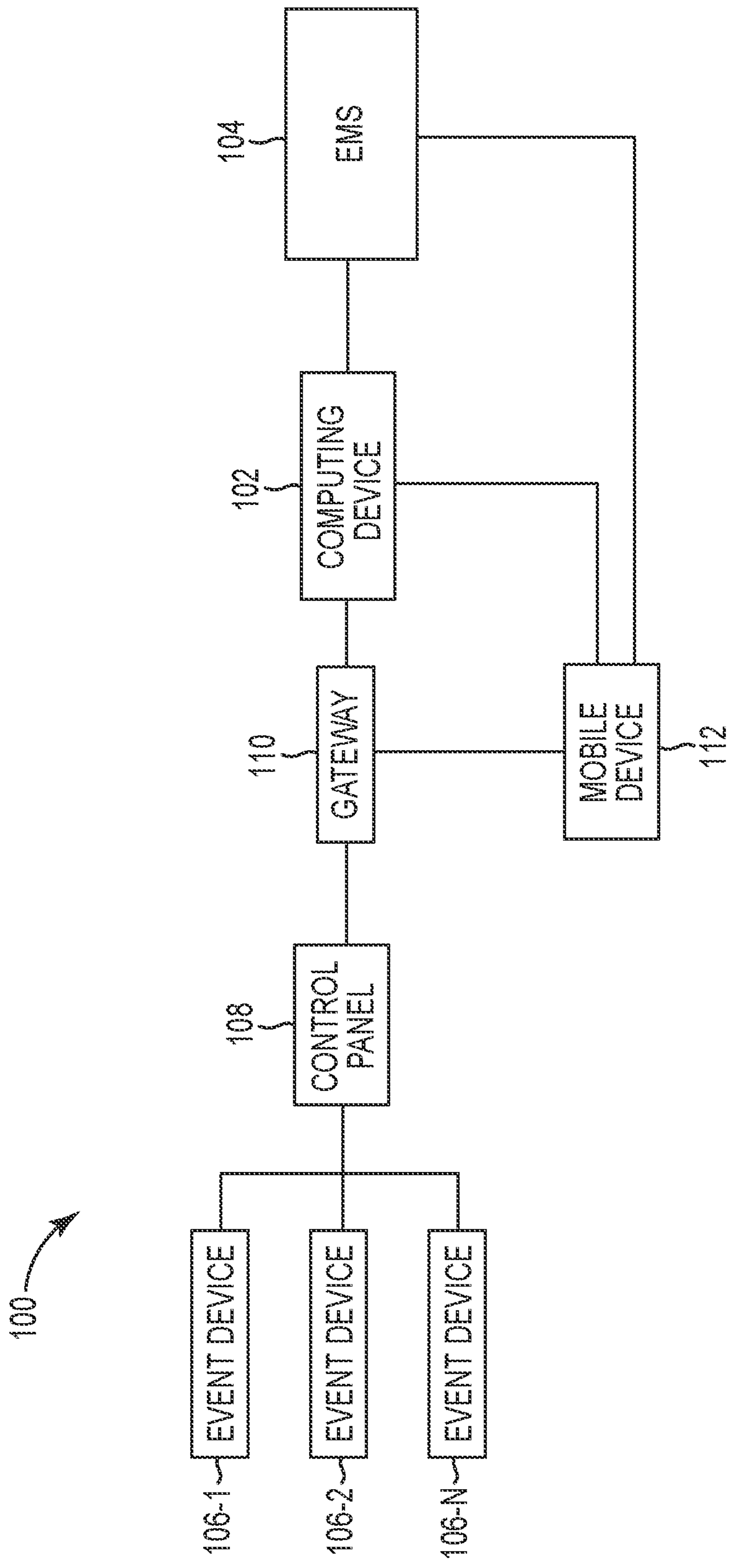
FIG. 1 is an example of a system for predicting fire spread in a facility, in accordance with one or more embodiments of the present disclosure.

Devices, systems, and methods for predicting fire spread in a facility are described herein. In some examples, one or more embodiments include a computing device comprising a processor and a memory having instructions stored thereon which, when executed by the processor, cause the processor to receive an indication of a fire detected by an event device of a plurality of event devices installed in a facility, sort the plurality of event devices into a plurality of priority levels based on a determined likelihood of fire spread to each of the plurality of event devices, receive data collected by the plurality of event devices during the fire, and provide, via an interface, graphical information descriptive of a spread of the fire based on the received data.

A facility can utilize an event system in order to warn occupants of the facility of an emergency event, such as a fire. An event system can be a system of devices that operate to collect information about a facility and provide the collected information for analysis. Such an event system can also take actions based on the collected information, such as providing an audible and/or visible warning in an emergency event. For example, the event system can utilize event devices to warn occupants of the emergency event occurring in the space, such as a fire. As used herein, the term "event device" refers to a device that can receive an input relating to an event and/or generate an output relating to an event. Such event devices can be a part of the event system of a space in a facility/in the facility at large and can include devices such as fire sensors, smoke detectors, heat detectors, carbon monoxide (CO) detectors, or combinations of these; air quality sensors; interfaces; manual call points (MCPs); pull stations; input/output modules; aspirating units; and/or audio/visual devices (e.g., speakers, sounders, flashers, buzzers, microphones, cameras, video displays, video screens, etc.), relay output modules, among other types of event devices.

Event devices can generate alarms in response to detecting a fire in a facility, for instance. When an alarm is first reported to a fire station or firefighting personnel from a central station or public safety answering point (PSAP), a fire incident commander may devise a plan and begin to travel to the facility for rescue and firefighting. In the meantime, consecutive alarm events can continue to flow in, so action plans change accordingly. In previous approaches, incident commanders may not have the ability to identify the spread (e.g., spread direction) of a fire or the time it will take to spread to various areas of a facility. Additionally, previous approaches may lack information about areas that are safe or unsafe for firefighters to enter.

Embodiments of the present disclosure can determine the predicted spread of a fire withing a facility based on data received in real time from devices therein and knowledge about the layout of the facility. This knowledge can include structural aspects, such as construction materials and/or sources of combustible fuel (e.g., gas pipelines). For example, embodiments herein include detecting a fire in the facility with a first event device and sorting the rest of the event devices of the facility into different priority levels based on factors including their proximity to the first device, their location context within the facility, and the values of detected variables (e.g., smoke, carbon monoxide, temperature, etc.), among others. In some embodiments, for instance, a subset of the total quantity of event devices are sorted into three priority levels. Those in the highest priority level have the most relevant data and thus data from those devices is received at a higher frequency than those at lower levels. While the fire is spreading this data is received and embodiments herein can determine and display useful information regarding the spread of the fire, such as the speed and/or direction of its spread. Some embodiments, for instance, display different colors on a rendering of the facility to inform firefighting personnel of areas of the facility that may be safe to enter and other areas that may not be safe. Some embodiments display alerts for a detector that is located proximal to particular danger (e.g., combustible material).

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component.

FIG. 1 is an example of a system 100 for predicting fire spread in a facility, in accordance with one or more embodiments of the present disclosure. The system 100 can include a computing device 102, an environmental monitoring system (EMS) 104, event devices 106-1, 106-2, 106-N, a control panel 108, a gateway 110, and a mobile device 114.

As mentioned above, the system 100 can be included in a facility, a space in a facility, etc. The system 100 can include a device/series of devices in order to detect events and/or process and/or analyze the detected events to determine whether to generate an alarm for occupants of the facility.

For example, the system 100 can include event devices 106-1, 106-2, 106-N (referred to collectively as event devices 106). The event devices 106 can be devices to detect an event and transmit the detected event for processing and/or analysis. As mentioned above, the event devices 106 can include, for example, cameras, motion sensors, fire sensors, smoke detectors, heat detectors, carbon monoxide (CO) detectors, fixed gas and/or flame detectors, aspirating smoke detectors, beam smoke detectors, or combinations of these; air quality sensors; interfaces; manual call points (MCPs); pull stations; input/output modules; aspirating units; sprinkler controls; and/or audio/visual devices (e.g., speakers, microphones, cameras, video displays, video screens, etc.), relay output modules, among other types of event devices.

Such event devices 106 can include detectors. As used herein, the term "detector" refers to a device to measure events and/or changes in its environment and transmit the detected events and/or changes for processing and/or analysis. For example, an event device 106-1 can be a smoke detector and can include a detector that measures amounts of smoke in a sample. Event devices in accordance with the present disclosure can detect, for instance, analog values of detected smoke before and/or after the detection of the fire, temperature values before and/or after the detection of the fire, as well as carbon monoxide, and others.

The system 100 can further include a control panel 108. The control panel 108 can be utilized to control the various event devices 106 included in the system 100.

The control panel 108 can be connected to the event devices 106 and to a gateway 110. The gateway 110 can be a device (e.g., a building system gateway) that provides a communication link between the control panel 108 and other devices, such as the computing device 102 and the mobile device 112. For example, the gateway 110 may enable transmission of data (e.g., system device data, activation signals, etc.) from the event devices 106 to the computing device 102 and/or the mobile device 112 via the control panel 108 and vice versa.

The facility can further include an environmental monitoring system (EMS) 104. An environmental monitoring system can include device(s) that monitor and/or detect a condition in an area. For example, an environmental monitoring system may include sensors or other devices that can detect an event that occurs (e.g., a door opening, a window being shut, a temperature of a space, a flow rate of an air duct, etc.). In some examples, an environmental monitoring system can include a building management system (BMS). As used herein, the term "building management system" refers to a computing-based automation and control system utilized in a facility to monitor, regulate, and/or control the facility's electrical and mechanical equipment, including power, lighting, and ventilation, among other types of equipment in a facility. The building management system can utilize a building information model having data associated with a facility (e.g., data associated with components, equipment, and/or properties of the facility). For example, building information model data can include data from devices associated with components and/or equipment associated with architectural, mechanical, electrical plumbing, sanitary, and/or any other systems in the facility. Additionally, building information model data can include architectural, mechanical, electrical, plumbing, sanitary, fire, and/or geometrical information associated with a building via various floor plans of the facility, and can be represented in two-dimensional (2D) plans and/or three-dimensional (3D) plans.

Further included in the system 100 is the mobile device 112. The mobile device 112 can be utilized by an occupant of the facility, such as a building manager, engineer, maintenance personnel, etc., and/or by personnel outside of the facility (e.g., firefighting personnel).

As illustrated in FIG. 1, the event devices 106 can be connected to the computing device 102 and/or the mobile device 112 (e.g., via the control panel 108 and gateway 110). Additionally, the EMS 104 can be connected to the computing device 102 and/or the mobile device 112. Such devices can be connected via a network relationship. Examples of such a network relationship can include a local area network (LAN), wide area network (WAN), personal area network (PAN), a distributed computing environment (e.g., a cloud computing environment), storage area network (SAN), Metropolitan area network (MAN), a cellular communications network, Long Term Evolution (LTE), visible light communication (VLC), Bluetooth, Worldwide Interoperability for Microwave Access (WiMAX), Near Field Communication (NFC), infrared (IR) communication, Public Switched Telephone Network (PSTN), radio waves, and/or the Internet, among other types of network relationships.

As used herein, the term "computing device" refers to an electronic system having a processing resource, memory resource, and/or an application-specific integrated circuit (ASIC) that can process information. Examples of computing devices can include, for instance, a laptop computer, a notebook computer, a desktop computer, an All-In-One (AIO) computing device, a server, networking equipment (e.g., router, switch, etc.), and/or a mobile device, among other types of computing devices. As used herein, a mobile device can include devices that are (or can be) carried and/or worn by a user. For example, a mobile device can be a phone (e.g., a smart phone), a tablet, a personal digital assistant (PDA), smart glasses, and/or a wrist-worn device (e.g., a smart watch), among other types of mobile devices.

In order to predict fire spread, the computing device 102 can receive information from various entities in the system 100. Information can be received from the event devices 106, the EMS 104, and/or from the mobile device 112, as is further described herein.

The computing device 102 can receive information from the event devices 106. For example, the event devices 106 can transmit information to the computing device via the control panel 108 and the gateway 110. The information from the event devices 106 can include any data measurable by the event devices 106. For example, the data from the event devices 106 can include pre-alarm data prior to an event device 106 detecting an event, alarm data after an event device 106 detects an event, operational data not associated with an event, spike events, etc. For example, pre-alarm data can include detector data relative to a detection threshold, A to D values from the event device 106, etc. For instance, event device 106-1 can be a heat detector and transmit, to the computing device 102, a heat level (e.g., a temperature) relative to a threshold temperature to the computing device 102. Additionally, event device 106-2 can be a smoke detector and transmit a smoke level relative to a threshold smoke amount, event device 106-N can be a CO detector and transmit a CO level relative to a threshold amount, etc.

Additionally, in response to an event device 106 detecting an event, the event devices 106 can transmit information that includes alarm data to the computing device 102 after an event device 106 detects an event. For example, the event device 106-1 may detect an event (e.g., a detected temperature exceeds a threshold temperature), and the event device 106-1 can transmit the alarm data (e.g., the detected temperature) to the computing device 102.

The computing device 102 can additionally receive information from the EMS 104 of the facility. As mentioned above, information from the EMS 104 can include environmental information such as information from devices as well as building information model data from devices associated with components and/or equipment associated with architectural, mechanical, electrical plumbing, sanitary, and/or any other systems in the facility, as well as information associated with floor plans of the facility. Floor plans can include drawings and/or models, such as computer-aided design (CAD) drawing(s) and/or building information modeling (BIM) model(s), for instance. Such information from the EMS 104 of the facility can provide environmental data about the facility in addition to information detected by the event devices 106. For example, information from the EMS 104 can provide contextual information about what was going on in a space prior to and when an event is detected. For instance, if event device 106-2 is an air quality sensor that detects a drop in air quality, the building system information from the EMS 104 can provide contextual information that a door to the space was left open (e.g., via a door sensor connected to the EMS 104) that may have allowed dirty air to interact with the event device 106-2.

Figure 2:
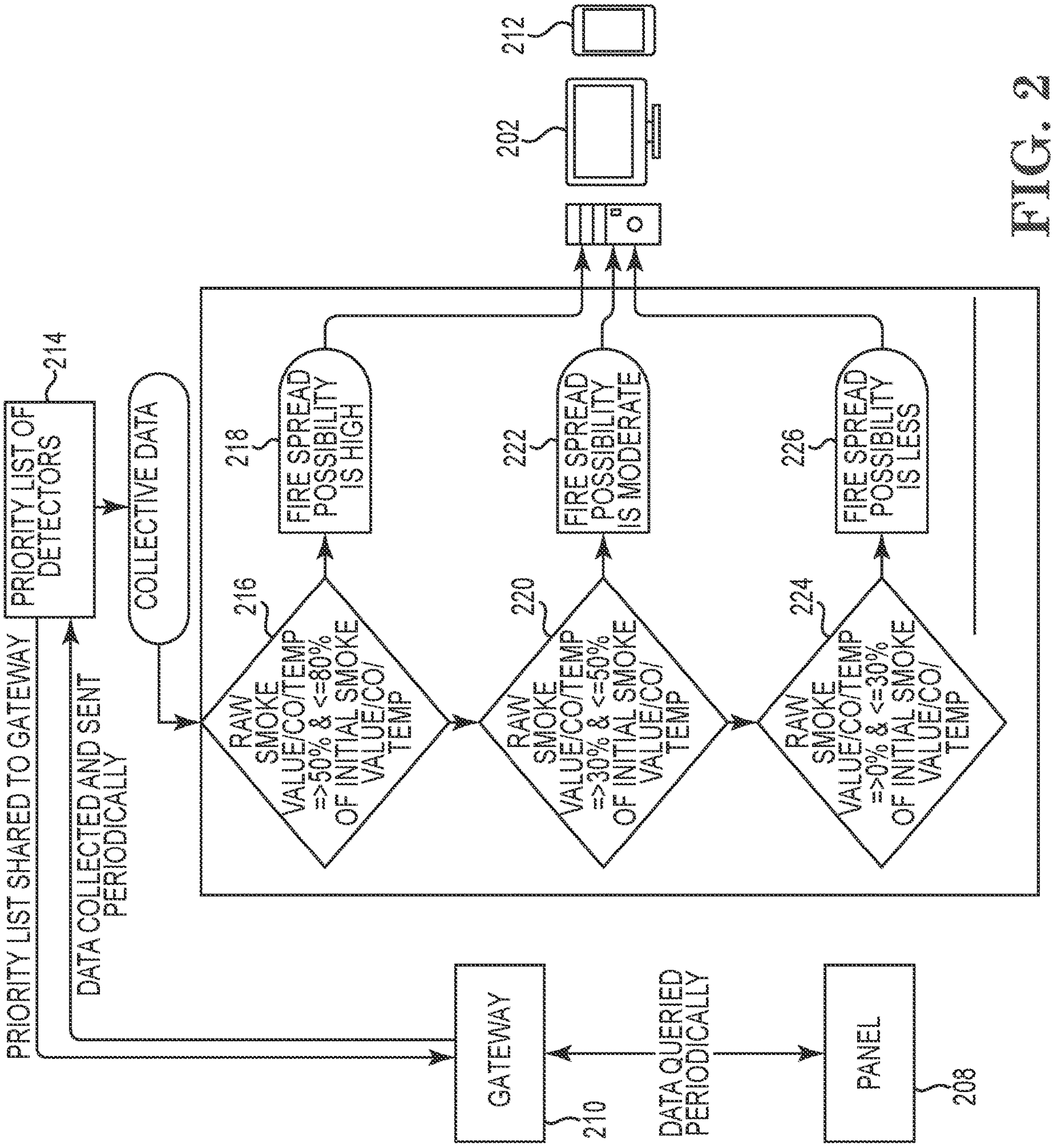
FIG. 2 is a flow chart associated with predicting fire spread in a facility in accordance with one or more embodiments of the present disclosure.

FIG. 2 is a flow chart associated with predicting fire spread in a facility in accordance with one or more embodiments of the present disclosure. Embodiments herein include detecting a fire in the facility with a first event device and sorting the rest of the event devices of the facility into different priority levels based on factors including their proximity to the first device, their location context within the facility, and the values of detected variables (e.g., smoke, carbon monoxide, temperature, etc.), among others. In some embodiments, for instance, a subset of the total quantity of event devices are sorted into three priority levels. Those in the highest priority level have the most relevant data and thus data from those devices is received at a higher frequency than those at lower levels.

The gateway 210 can periodically query data from the panel 208. When a fire is detected, based upon analytics a priority list can be prepared at 214 and communicated to a computing device 202 and/or mobile device 212. The priority list can include devices of a first priority level 216. Devices of the first priority level can include those devices that are detecting smoke values, carbon monoxide levels, and/or temperature values that are over 50 percent greater than initial (e.g., pre-event) values. In some embodiments, devices of the first priority level include those devices that are detecting smoke values, carbon monoxide levels, and/or temperature values that are between 50 percent and 80 percent greater than initial values. Embodiments of the present disclosure can, at 218, determine that the possibility of fire spreading to these devices is high. Consequently, data from those devices can be collected at a first (e.g., high) frequency.

The priority list can include devices of a second priority level 220. In some embodiments, devices of the second priority level include those devices that are detecting smoke values, carbon monoxide levels, and/or temperature values that are between 30 percent and 50 percent greater than initial values. Embodiments of the present disclosure can, at 222, determine that the possibility of fire spreading to these devices is moderate. Consequently, data from those devices can be collected at a second (e.g., moderate) frequency.

The priority list can include devices of a third priority level 224. In some embodiments, devices of the third priority level include those devices that are detecting smoke values, carbon monoxide levels, and/or temperature values that are between 0 percent and 30 percent greater than initial values. Embodiments of the present disclosure can, at 226, determine that the possibility of fire spreading to these devices is low. Consequently, data from those devices can be collected at a third (e.g., low) frequency.

In some embodiments, devices can be sorted into priority levels based on factors other than detected values. These factors can include structural aspects, such as construction materials and/or sources of combustible fuel (e.g., gas pipelines). For example, embodiments herein include detecting a fire in the facility with a first event device and sorting the rest of the event devices of the facility into different priority levels based on factors including their proximity to the first device and their location context within the facility.

Figure 3:
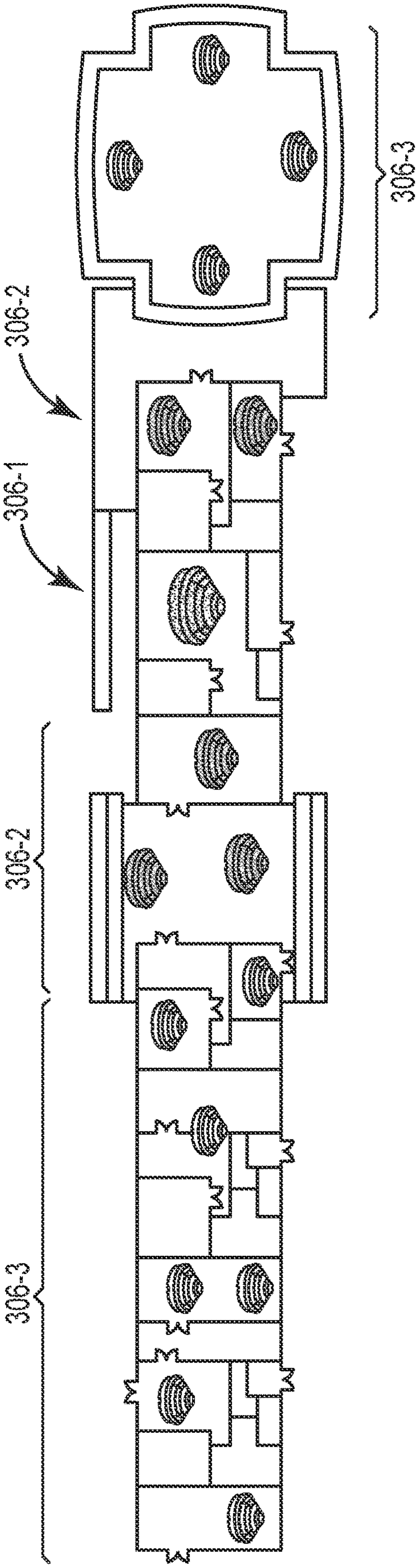
FIG. 3 is an example graphical view of a portion of a facility during an event in accordance with one or more embodiments of the present disclosure.

FIG. 3 is an example graphical view of a portion of a facility during an event in accordance with one or more embodiments of the present disclosure. As previously discussed, while the fire is spreading this data is received and embodiments herein can determine and display useful information regarding the spread of the fire, such as the speed and/or direction of its spread. Some embodiments, for instance, display different colors on a rendering of the facility to inform firefighting personnel of areas of the facility that may be safe to enter and other areas that may not be safe. Some embodiments display alerts for a detector that is located proximal to particular danger (e.g., combustible material).

Based on the analysis from the periodically collected sensor data and an available diagram of the facility, embodiments herein can predict fire spread possibility and inform users in an intelligible manner. As shown in FIG. 3, for instance, a first detector 306-1 was the detector that first detected the fire. This detector can be displayed in a particular manner to communicate this. In some embodiments, the detector that first detected a fire can be displayed using a particular color (e.g., red).

Devices that were sorted into the different priority levels discussed above can be displayed in other manners that communicate their priority level. For instance, groups of devices that fall into the first (e.g., high) priority level are the devices adjacent to the device 306-1 shown in FIG. 3. These devices 306-2 can be displayed in a different color (e.g., yellow), in some embodiments. Other groups of devices that fall into the second (e.g., moderate) and/or third (e.g., low) priority levels are the devices adjacent to the devices 306-2 shown in FIG. 3. These devices 306-3 can be displayed in a different color (e.g., green), in some embodiments.

These green regions can be considered by firefighting personnel as "safe" regions that can be utilized to gain access to the facility for evacuation and/or fire suppression, for instance. Yellow and/or red areas may be those areas in which extra precaution is advised. In some embodiments, information regarding when the fire is predicted to reach a particular device can be displayed (e.g., upon selection of device(s) in the display shown in FIG. 3). For example, the display can show "in next 10 minutes fire will reach device L01D002." In addition, location context, including environmental risk factors can be communicated via the display shown in FIG. 3. Such information can include an indication that a particular device is near a gas pipeline, near a mailroom, near a wooden wall, etc.

Figure 4:
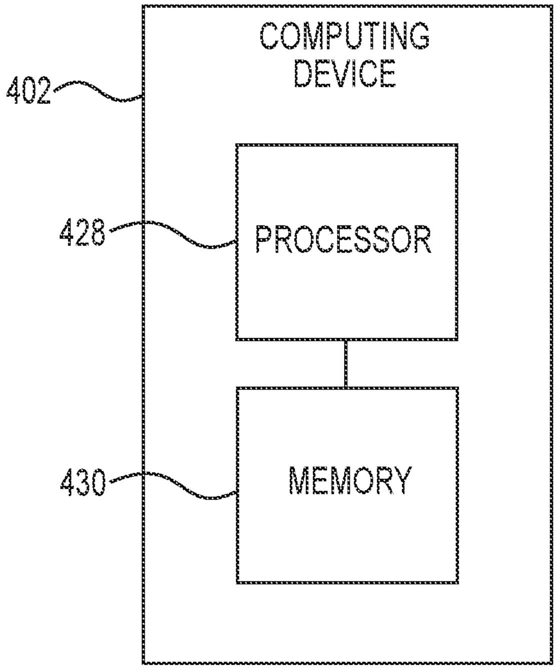
FIG. 4 is an example of a computing device for predicting fire spread in a facility, in accordance with one or more embodiments of the present disclosure.

FIG. 4 is an example of a computing device 402 for predicting fire spread in a facility, in accordance with one or more embodiments of the present disclosure. As illustrated in FIG. 4, the computing device 402 can include a memory 430 and a processor 428, in accordance with the present disclosure.

The memory 430 can be any type of storage medium that can be accessed by the processor 428 to perform various examples of the present disclosure. For example, the memory 430 can be a non-transitory computer readable medium having computer readable instructions (e.g., executable instructions/computer program instructions) stored thereon that are executable by the processor 428 for predicting fire spread in a facility in accordance with the present disclosure.

The memory 430 can be volatile or nonvolatile memory. The memory 430 can also be removable (e.g., portable) memory, or non-removable (e.g., internal) memory. For example, the memory 430 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 430 is illustrated as being located within computing device 402, embodiments of the present disclosure are not so limited. For example, memory 430 can also be located internal to another computing resource (e.g., enabling computer readable instructions to be downloaded over the Internet or another wired or wireless connection).

The processor 428 may be a central processing unit (CPU), a semiconductor-based microprocessor, and/or other hardware devices suitable for retrieval and execution of machine-readable instructions stored in the memory 430.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computing device for predicting fire spread in a facility, comprising:

a processor; and a memory having instructions stored thereon which, when executed by the processor, cause the processor to:

receive an indication of a fire detected by an event device of a plurality of event devices installed in a facility;

sort the plurality of event devices into a plurality of priority levels based on a determined likelihood of fire spread to each of the plurality of event devices;

receive data collected by the plurality of event devices during the fire; and provide, via an interface, graphical information descriptive of a spread of the fire based on the received data.

2. The computing device of claim 1, including instructions to receive data collected by the plurality of event devices before the detection of the fire by the event device.

3. The computing device of claim 2, including instructions to receive, from each of the plurality of event devices:

an analog value of detected smoke before the detection of the fire;

an analog value of detected smoke during the fire;

a detected temperature value during the fire;

a sensitivity level before the detection of the fire; and a sensitivity level during the fire.

4. The computing device of claim 1, wherein the graphical information descriptive of the fire includes an identification of a first region of the facility where entry by firefighters is recommended.

5. The computing device of claim 1, wherein the graphical information descriptive of the fire includes an identification of a second region of the facility where entry by firefighters is not recommended.

6. The computing device of claim 1, wherein the graphical information descriptive of the fire includes a display of a floorplan of the facility including a current location of the fire.

7. The computing device of claim 1, wherein the graphical information descriptive of the fire includes an indication of an environmental risk factor in a particular location within the facility.

8. The computing device of claim 1, wherein the graphical information descriptive of the fire includes a predicted spread direction and predicted spread time associated with the fire.

9. A non-transitory computer readable medium having computer readable instructions stored thereon that are executable by a processor to:

receive an indication of a fire detected by an event device of a plurality of event devices installed in a facility;

determine, for each of the plurality of event devices, a respective likelihood of fire spread to that event device;

sort each of the plurality of event devices into a first priority level, a second priority level, or a third priority level based on the respective likelihoods;

receive data collected by event devices in the first priority level during the fire at a first frequency;

receive data collected by event devices in the second priority level during the fire at a second frequency;

receive data collected by event devices in the third priority level during the fire at a third frequency; and provide, via an interface, graphical information descriptive of a spread of the fire based on the received data.

10. The medium of claim 9, wherein the event devices in the first priority level, the event devices in the second priority level, and the event devices in the third priority level are cumulatively fewer than a total quantity of event devices installed in the facility.

11. The medium of claim 9, wherein:

the first priority level is associated with a high likelihood of fire spread;

the second priority level is associated with a moderate likelihood of fire spread;

the third priority level is associated with a low likelihood of fire spread;

the first frequency exceeds the second frequency; and the second frequency exceeds the third frequency.

12. The medium of claim 11, wherein the first frequency is between 8 and 12 minutes, the second frequency is between 18 and 22 minutes, and the third frequency is between 28 and 32 minutes.

13. The medium of claim 9, wherein the graphical information descriptive of the fire includes:

a first color identifying a first region of the facility where entry by firefighters is recommended; and a second color identifying a second region of the facility where entry by firefighters is not recommended.

14. The medium of claim 9, including instructions to determine, for each of the plurality of event devices, the respective likelihood of fire spread to that event device based on a location of that event device in the facility.

15. The medium of claim 14, including instructions to determine, for each of the plurality of event devices, the respective likelihood of fire spread to that event device based on a proximity of that event device to combustible material.

16. A system, comprising:

a plurality of event devices in a facility;

an environmental monitoring system (EMS) in the facility;

a computing device configured to:

receive an indication of a fire detected by an event device of the plurality of event devices;

sort the plurality of event devices into a plurality of priority levels based on a determined likelihood of fire spread to each of the plurality of event devices;

receive data collected by the plurality of event devices during the fire; and provide, via an interface, graphical information descriptive of a spread of the fire based on the received data.

17. The system of claim 16, including instructions to receive, from each of the plurality of event devices:

an analog value of detected smoke before the detection of the fire;

an analog value of detected smoke during the fire;

a detected temperature value before the detection of the fire;

a detected temperature value during the fire;

a sensitivity level before the detection of the fire; and a sensitivity level during the fire.

18. The system of claim 17, including instructions to determine a first spread possibility associated with a particular event device responsive to:

a determination that the analog value of detected smoke during the fire exceeds the analog value of detected smoke before the detection of the fire by less than 30 percent; or a determination that the detected temperature value during the fire exceeds the detected temperature value before the detection of the fire by less than 30 percent.

19. The system of claim 18, including instructions to determine a second spread possibility associated with a particular event device responsive to:

a determination that the analog value of detected smoke during the fire exceeds the analog value of detected smoke before the detection of the fire by between 30 percent and 50 percent; or a determination that the detected temperature value during the fire exceeds the detected temperature value before the detection of the fire by between 30 percent and 50 percent.

20. The system of claim 19, including instructions to determine a first spread possibility associated with a particular event device responsive to:

a determination that the analog value of detected smoke during the fire exceeds the analog value of detected smoke before the detection of the fire by 50 percent; or a determination that the detected temperature value during the fire exceeds the detected temperature value before the detection of the fire by 50 percent.

* * * * *